United States Patent
Kim et al.

(10) Patent No.: US 11,388,469 B2
(45) Date of Patent: Jul. 12, 2022

(54) METHODS, APPARATUSES, COMPUTER-READABLE MEDIA AND SYSTEMS FOR PROCESSING HIGHLIGHTED COMMENT IN VIDEO

(71) Applicant: NAVER Corporation, Seongnam-si (KR)

(72) Inventors: Hyun-Soo Kim, Seongnam-si (KR); Yearim Cho, Seongnam-si (KR); Sun Ju, Seongnam-si (KR); Bo-keum Choi, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 0 days.

(21) Appl. No.: 16/122,053

(22) Filed: Sep. 5, 2018

(65) Prior Publication Data

US 2019/0082214 A1 Mar. 14, 2019

(30) Foreign Application Priority Data

Sep. 14, 2017 (KR) ........................ 10-2017-0117645

(51) Int. Cl.
*H04N 21/431* (2011.01)
*H04N 21/488* (2011.01)
(Continued)

(52) U.S. Cl.
CPC ......... *H04N 21/4316* (2013.01); *G06F 16/34* (2019.01); *H04N 21/4882* (2013.01); *H04N 21/84* (2013.01); *H04N 21/8456* (2013.01)

(58) Field of Classification Search
CPC ........... H04N 21/4316; H04N 21/4882; H04N 21/84; H04N 21/8456
See application file for complete search history.

(56) References Cited

U.S. PATENT DOCUMENTS 9,501,758 B2 * 11/2016 Roberts ................. G06Q 10/10
10,095,390 B1 * 10/2018 Lewis ................... G06F 3/0482
(Continued)

FOREIGN PATENT DOCUMENTS

JP      2008-003973 A     1/2008
JP      2008-278088 A    11/2008
(Continued)

OTHER PUBLICATIONS

Japanese Office Action dated Aug. 13, 2019 for corresponding Japanese Application No. 2018-160063.
(Continued)

*Primary Examiner* — Pinkal R Chokshi
(74) *Attorney, Agent, or Firm* — Harness, Dickey & Pierce, PLC

(57) ABSTRACT

A comment processing method may include specifying, using at least one processor, a desired section in a video in response to a selection of a user, registering, using the at least one processor, a first comment input from the user to the specified section with a server by causing the server to associate the first comment of a plurality of comments with the specified section of a plurality of sections of the video, and outputting, using the at least one processor, at least one comment among the plurality of comments registered to at least one corresponding section among the plurality of sections to a display at a point in time at which the at least one corresponding section is played.

20 Claims, 13 Drawing Sheets

(51) Int. Cl.
*H04N 21/845* (2011.01)
*H04N 21/84* (2011.01)
*G06F 16/34* (2019.01)

(56) References Cited

U.S. PATENT DOCUMENTS

| | | | |
|---|---|---|---|
| 2005/0160113 A1* | 7/2005 | Sipusic | G06F 16/745 |
| 2006/0053364 A1 | 3/2006 | Hollander et al. | |
| 2009/0164484 A1* | 6/2009 | Horowitz | H04N 21/8133 |
| 2009/0199098 A1* | 8/2009 | Kweon | H04N 21/8455 |
| | | | 715/716 |
| 2010/0122309 A1* | 5/2010 | Kawakami | H04N 21/4307 |
| | | | 725/116 |
| 2010/0241968 A1 | 9/2010 | Tarara et al. | |
| 2011/0119694 A1* | 5/2011 | Roberts | H04N 21/4756 |
| | | | 725/9 |
| 2011/0246463 A1* | 10/2011 | Carson, Jr. | G06F 16/35 |
| | | | 707/737 |
| 2013/0004138 A1* | 1/2013 | Kilar | H04N 21/4788 |
| | | | 386/230 |
| 2013/0041956 A1 | 2/2013 | Davenport et al. | |
| 2013/0069976 A1 | 3/2013 | Lee | |
| 2013/0073673 A1* | 3/2013 | McMahon | H04N 21/43615 |
| | | | 709/217 |
| 2013/0097481 A1 | 4/2013 | Kotler et al. | |
| 2013/0191720 A1 | 7/2013 | Simons et al. | |
| 2014/0002736 A1* | 1/2014 | Kaushal | H04N 21/8455 |
| | | | 348/468 |
| 2014/0013200 A1* | 1/2014 | White | H04N 21/4788 |
| | | | 715/230 |
| 2014/0068433 A1* | 3/2014 | Chitturi | H04N 21/41407 |
| | | | 715/716 |
| 2014/0137144 A1* | 5/2014 | Jarvenpaa | H04N 21/25891 |
| | | | 725/13 |
| 2014/0196082 A1* | 7/2014 | Maruyama | G09G 5/00 |
| | | | 725/32 |
| 2014/0199046 A1* | 7/2014 | Lindsey | H04N 9/8707 |
| | | | 386/244 |
| 2014/0325557 A1* | 10/2014 | Evans | H04N 21/4307 |
| | | | 725/34 |
| 2015/0261853 A1 | 9/2015 | Shao | |
| 2015/0346955 A1* | 12/2015 | Fundament | H04N 21/4821 |
| | | | 715/765 |
| 2016/0063117 A1 | 3/2016 | Carter et al. | |
| 2016/0219338 A1* | 7/2016 | Wang | H04N 21/4788 |
| 2016/0277328 A1* | 9/2016 | Ishizuka | H04N 21/8547 |
| 2016/0286244 A1* | 9/2016 | Chang | H04N 21/21805 |
| 2017/0142047 A1 | 5/2017 | Mendiola | |
| 2017/0229152 A1* | 8/2017 | Loganathan | G11B 27/34 |
| 2017/0257410 A1* | 9/2017 | Gattis | H04N 21/8455 |
| 2017/0289619 A1* | 10/2017 | Xu | H04N 21/251 |
| 2018/0191660 A1* | 7/2018 | Tene | G06Q 10/101 |
| 2018/0329582 A1 | 11/2018 | Clediere et al. | |
| 2018/0337880 A1* | 11/2018 | Sokolov | H04N 21/6581 |

FOREIGN PATENT DOCUMENTS

| | | |
|---|---|---|
| JP | 2013-003685 A | 1/2013 |
| JP | 2014-010677 A | 1/2014 |
| JP | 2014-11597 A | 1/2014 |
| JP | 2015-005940 A | 1/2015 |
| JP | 2015-513134 A | 4/2015 |
| JP | 2017-16294 A | 1/2017 |
| JP | 2017-016535 A | 1/2017 |
| JP | 2017-027144 A | 2/2017 |
| JP | 6195687 B1 | 9/2017 |
| KR | 10-2006-0057079 A | 5/2006 |
| KR | 10-2013-0029579 A | 3/2013 |
| KR | 10-2014-0080608 A | 7/2014 |
| KR | 10-2014-0125361 A | 10/2014 |
| KR | 10-2014-0140202 A | 12/2014 |
| KR | 10-1665579 B1 | 10/2016 |
| KR | 10-2017-0029933 A | 3/2017 |
| WO | WO-2014/013689 A1 | 1/2014 |
| WO | WO-2017/010720 A1 | 1/2017 |

OTHER PUBLICATIONS

Kazuho Yamada et al., "A Proposal of Audience-Communications Using Video Structures," Information Processing Society of Japan, vol. 2002, No. 31 pp. 37-42, Mar. 23, 2002.

Japanese Office Action dated Jul. 2, 2019 in Japanese Application No. 2018-134856.

U.S. Office Action dated Jan. 10, 2020 for co-pending U.S. Appl. No. 16/039,433.

Japanese Office Action dated Dec. 3, 2019 for corresponding Japanese Application No. 2018-160063.

U.S. Office Action dated Apr. 27. 2020 for corresponding U.S. Appl. No. 16/039,433.

Google. (May 27, 2010). Tips & Tricks: Comments in Google Documents. Google Drive Blog. https://drive.googleblog.com/2010/05/tips-tricks-comments-in-google-documents.html (Year: 2010).

U.S. Office Action dated Oct. 29. 2020 for corresponding U.S. Appl. No. 16/039,433.

U.S. Office Action dated Dec. 29, 2021 for corresponding U.S. Appl. No. 16/039,433.

* cited by examiner

METHODS, APPARATUSES, COMPUTER-READABLE MEDIA AND SYSTEMS FOR PROCESSING HIGHLIGHTED COMMENT IN VIDEO

CROSS-REFERENCE TO RELATED APPLICATION(S)

This U.S. non-provisional application claims the benefit of priority under 35 U.S.C. § 119 to Korean Patent Application No. 10-2017-0117645 filed on Sep. 14, 2017, in the Korean Intellectual Property Office (KIPO), the entire contents of which are incorporated herein by reference.

BACKGROUND

Field

One or more example embodiments relate to a technique for processing comments on a video.

Description of Related Art

In the current ubiquitous computing environment, a user may access an Internet network and surf the web without restrictions regarding the time and/or the occasion. The Internet is indispensable for many users.

Through the Internet, users may provide information regarding what they know, may acquire a variety of information they desire, and may exchange a variety of information while exchanging mutual opinions.

One related web service is a comment service that allows users to access various websites and to provide opinions, information, etc., on and/or regarding a specific article of an accessed website.

Various Internet services including a personal content service, such as a personal homepage, a blog, etc., a social networking service, a portal service, and other media services, allow users to post comments. Thus, the users may easily share comments on content with other users in a comment form.

For example, conventional technology exists for processing a comment by transmitting the comment to an Internet website using a mobile communication terminal.

However, in the case of a general comment, a user may only post a comment regarding the entire content. Thus, it may be difficult to verify the context regarding which part of the content that attracts users to react and sympathize with.

SUMMARY

One or more example embodiments provide methods, devices, computer-readable media and systems that enable a user to highlight and to post a comment on a partial section selected by the user in a video.

One or more example embodiments also provide methods, devices, computer-readable media and systems that may provide a highlighted comment based on a played section during a process of playing a video.

According to an aspect of at least one example embodiment, there is provided a computer-implemented comment processing method including specifying, using at least one processor, a desired section in a video in response to a selection of a user, registering, using the at least one processor, a first comment input from the user to the specified section with a server by causing the server to associate the first comment of a plurality of comments with the specified section of a plurality of sections of the video, and outputting, using the at least one processor, at least one comment among the plurality of comments registered to at least one corresponding section among the plurality of sections to a display at a point in time at which the at least one corresponding section is played.

The outputting includes outputting the at least one comment to the display in a layer form at a desired location of a screen area on which the video is played.

The outputting includes outputting an infographic to the display that is a visual representation of data of the at least one corresponding section as a comment timeline for an entire play section of the video.

The outputting includes highlighting the at least one corresponding section to which the at least one comment is registered in the video using an indicator.

The at least one corresponding section includes two or more sections among the plurality of sections, and the outputting includes, applying a different display element of the indicator for each of the two or more sections to which the at least one comment is registered in the video, and outputting the at least one comment to the display based on the display element of the indicator for the at least one corresponding section.

The outputting includes highlighting the at least one corresponding section to which the at least one comment is registered using a progress bar for the video.

The outputting includes outputting the at least one comment to the display only in response to, receiving a comment display request from the user, or determining that the video has been previously provided to the user.

The comment processing method may further include providing a list of comments among the plurality of comments registered to a selected section among the plurality of sections in response to a selection of a selected comment output to the display.

The comment processing method may further include providing an all-comment list of the plurality of comments registered to the video in response to a request from the user, wherein the providing includes outputting the plurality of comments such that partial section comments among the plurality of comments registered to one of the plurality of sections of the video are distinguished from other comments among the plurality of comments included in the all-comment list.

The providing includes outputting section information associated with each of the partial section comments in the all-comment list to the display.

According to an aspect of at least one example embodiment, there is provided a non-transitory computer-readable recording medium storing instructions that, when executed by at least one processor, cause the at least one processor to specify a desired section in a video in response to a selection of a user, register a first comment input from the user to the specified section with a server by causing the server to associate the first comment of a plurality of comments with the specified section of a plurality of sections of the video, and output at least one comment among the plurality of comments registered to at least one corresponding section among the plurality of sections to a display at a point in time at which the at least one corresponding section is played.

According to an aspect of at least one example embodiment, there is provided a computer-implemented comment processing system including at least one processor configured to execute computer-readable instructions to specify a desired section in a video in response to a selection of a user, and register a first comment input from the user to the specified section with a server by causing the server to associate the first comment of a plurality of comments with the specified section of a plurality of sections of the video, and output at least one comment among the plurality of comments registered to at least one corresponding section among the plurality of sections to a display at a point in time at which the at least one corresponding section is played.

According to some example embodiments, a user may post a comment on a video section that the user actually sympathizes with or enjoys in a video through highlighting the video section that the user desires to respond to and/or comment about, and the comment may be processed on a partial section of the video selected by the user, etc., thereby improving existing Internet commenting systems and/or online commenting systems by allowing users to specify exact portions, subsections, and/or positions of the video that they are commenting about, and allowing for viewers of the video and the posted comments to be able to view both the content and the response to the content contemporaneously and/or side-by-side, thereby improving and amplifying the effect of the comment. Further, because the commenter may comment directly on the video, the commenter may reach a wider audience regarding his or her comments than is possible using pre-Internet technology.

Also, according to some example embodiments, it is possible to verify a video and a user comment contemporaneously, and to easily verify the context of the comment and a point at which a user sympathizes with by providing a highlighted comment based on a play section during a process of playing the video.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
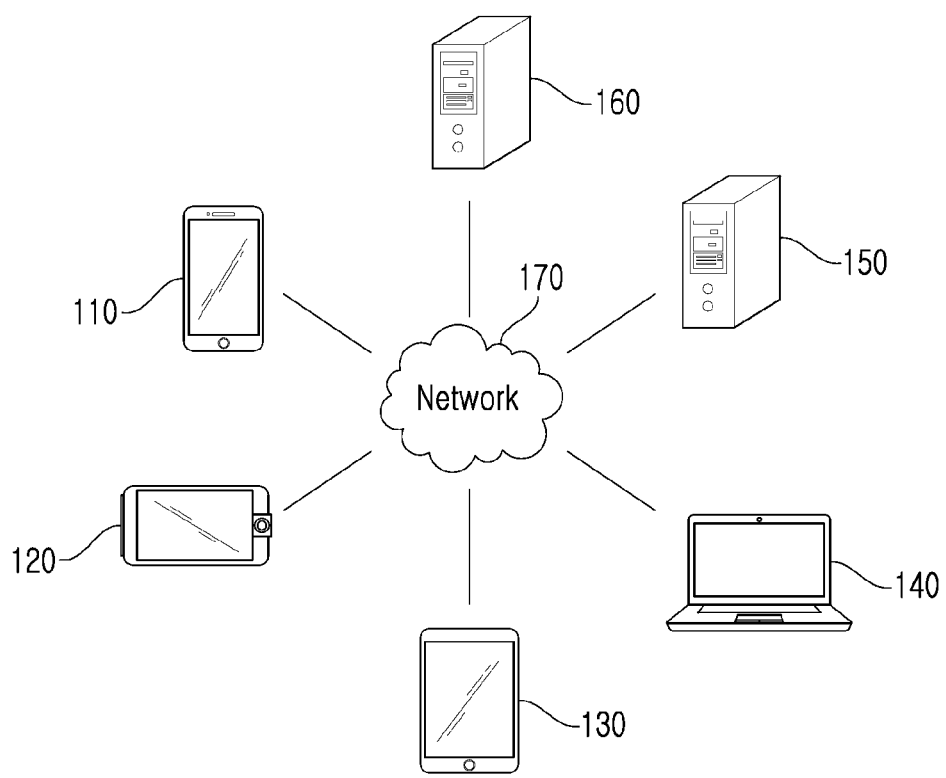
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for processing comments on a video, and more particularly, to methods, devices, computer-readable media and systems that may process a comment on a partial section in a video.

The example embodiments disclosed herein may allow a user to post and provide a comment on a partial section in a video, and may achieve many advantages in terms of understanding the context of a comment, efficiency, convenience, cost reduction, and the like.

FIG. 1 is a diagram illustrating an example of a network environment according to at least one example embodiment. Referring to FIG. 1, the network environment includes a plurality of electronic devices 110, 120, 130, and 140; a plurality of servers 150 and 160; and a network 170. FIG. 1 is provided as an example only and thus, the number of electronic devices, the number of servers, and/or the number of networks is not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, a tablet personal computer, a personal computer (PC), a navigation device, a workstation computer, a laptop computer, a digital broadcasting terminal, a personal digital assistant (PDA), a portable multimedia player (PMP), a gaming console, an Internet of Things (IoT) device, a Virtual Reality (VR) and/or Augmented Reality (AR) device, and the like. For example, the electronic device 110 may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and some example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170. For example, the server 160 may provide a file for installing an application to the electronic device 110 connected through the network 170. In this case, the electronic device 110 may install the application using the file provided from the server 160. Also, the electronic device 110 may access the server 150 under control of at least one program, for example, a browser or the installed application, or an operating system (OS) included in the electronic device 110, and may use a service or content provided from the server 150. For example, when the electronic device 110 transmits a service request message to the server 150 through the network 170 under control of the application, the server 150 may transmit a code (e.g., software, script, computer readable instructions, etc.) corresponding to the service request message to the electronic device 110 and the electronic device 110 may provide content to a user by configuring and displaying a screen according to the code under control of the application.

Figure 2:
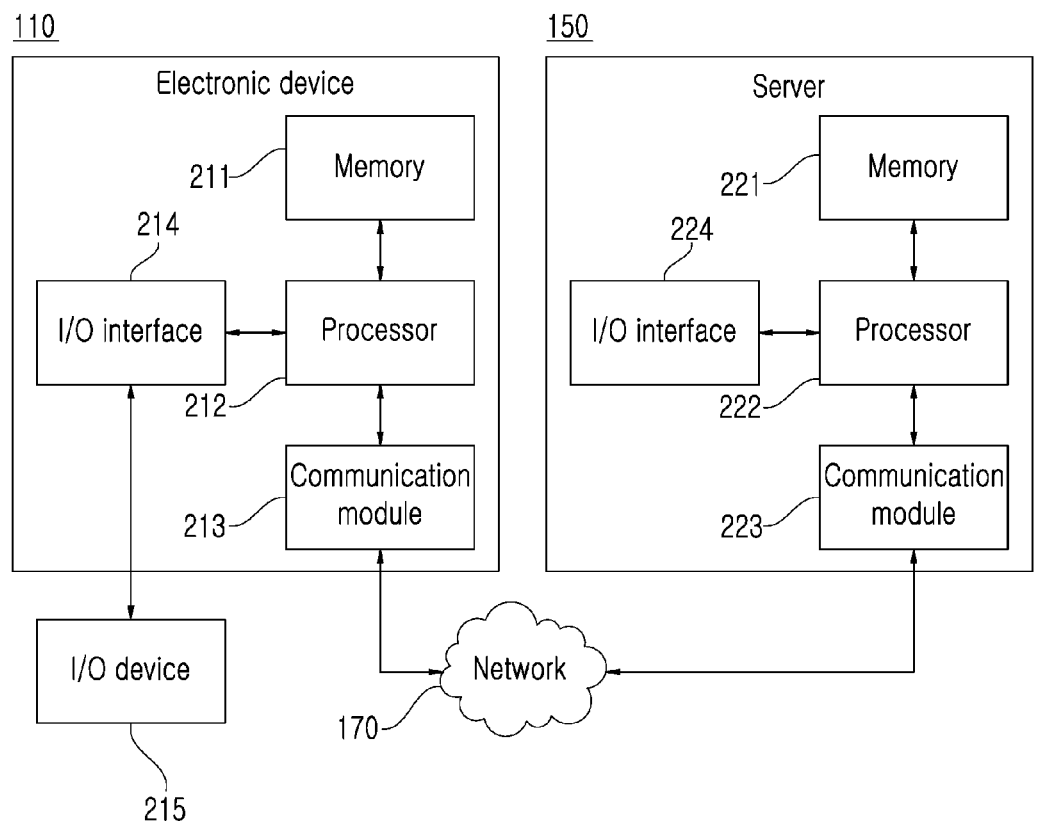
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and/or an input/output (I/O) interface 214, and the server 150 may include a memory 221, at least one processor 222, a communication module 223, and/or an I/O interface 224. However, the example embodiments are not limited thereto, and there may be a greater or lesser number of components included in either the electronic device 110 or the server 150. The memory 211, 221 may include a permanent mass storage device, such as random access memory (RAM), read only memory (ROM), a disk drive, a solid state drive, a flash memory, etc., as a non-transitory computer-readable storage medium. Also, an operating system (OS) or at least one program code, for example, a code for an application installed and executed on the electronic device 110, etc., may be stored in the memory 211, 221. Such software components may be loaded from another non-transitory computer-readable storage medium separate from the memory 211, 221. The other non-transitory computer-readable storage medium may include, for example, a floppy drive, a disk, a tape, a Blu-ray/DVD/CD-ROM drive, a memory card, etc. According to some example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, for example, a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, a microphone, a camera, a biometric reader, etc., and an output device may include a display device, such as a display for displaying a communication session of the application, a speaker, a haptic feedback device, etc. As another example, the I/O interface 214 may be a device for interface with an apparatus in which an input function and an output function are integrated into a single function, such as a touchscreen. In detail, when processing computer-readable instructions of the computer program loaded to the memory 211, the processor 212 of the electronic device 110 may display a service screen configured using data provided from the server 150 or the electronic device 120, or may display content on a display through the I/O interface 214. Likewise, the I/O interface 224 may also output information configured using data provided from the server 150 when the processor 222 of the server 150 processes computer-readable instructions of a computer program loaded to the memory 221.

According to some example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a haptic feedback motor for vibration, etc., which are generally included in the smartphone.

Hereinafter, example embodiments of methods, devices, computer-readable media and systems that may process a highlighted comment in a video.

Figure 3:
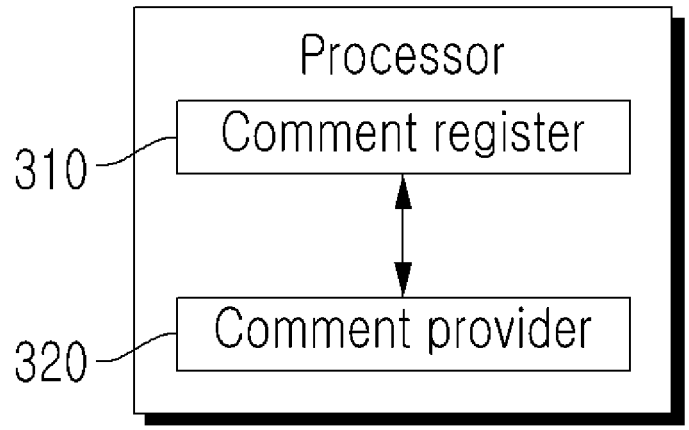
FIG. 3 is a block diagram illustrating an example of components includable in at least one processor of a server according to at least one example embodiment.
Figure 4:
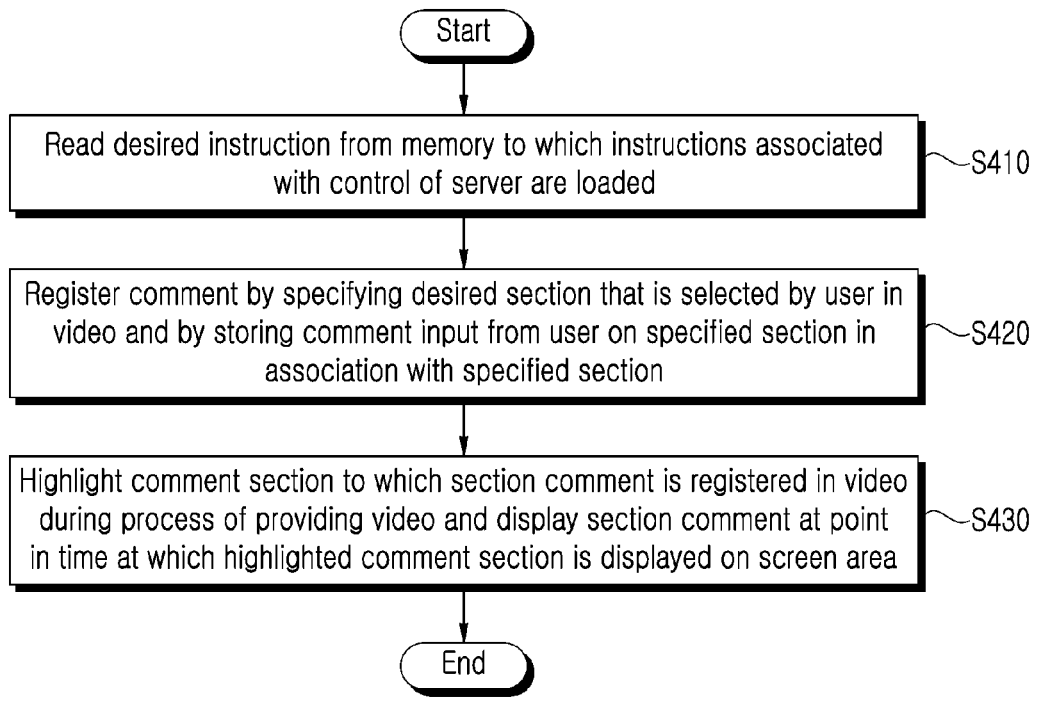
FIG. 4 is a flowchart illustrating an example of a method performed by a server according to at least one example embodiment.

FIG. 3 is a block diagram illustrating an example of components includable in at least one processor of a server according to at least one example embodiment, and FIG. 4 is a flowchart illustrating an example of a method performed by a server according to at least one example embodiment.

The server 150 according to some example embodiments may include a highlighted comment processing system configured as a computer. The server 150 may provide a video and at least one comment on, related to, in connection to, and/or regarding the video to the plurality of electronic devices 110, 120, 130, and/or 140 that are clients of the server 150. Here, the server 150 may provide a video corresponding to a service request and a comment on the video through a connection to a dedicated application installed on the electronic devices 110, 120, 130, and/or 140 and/or a website/mobile site associated with the server 150.

Referring to FIG. 3, to perform the highlighted comment processing method of FIG. 4, the processor 222 of the server 150 may include a comment register 310 and a comment provider 320 as components of the processor 222. Depending on example embodiments, the components of the processor 222 may be selectively included in or excluded from the processor 222. Also, the components of the processor 222 may be separate or merged to represent a function of the processor 222.

The processor 222 and the components of the processor 222 may control the server 150 to perform operations S410 through S430 included in the highlighted comment processing method of FIG. 4. For example, the processor 222 and the components of the processor 222 may be configured to execute computer-readable instructions according to a code of at least one program and/or a code of an OS included in the memory 221.

Also, the components of the processor 222 may be representations of different functions performed by the processor 222 in response to one or more computer-readable instructions provided by the program code stored in the server 150. For example, the comment register 310 may be used as a functional representation of the processor 222 to control the server 150 to register a comment in response to the computer-readable instruction.

Referring to FIG. 4, in operation S410, the processor 222 may read a desired computer-readable instruction from the memory 221 to which computer-readable instructions associated with control of the server 150 are loaded. In this case, the read instruction may include an instruction for controlling the processor 222 to perform the following operations S420 and S430.

In operation S420, the comment register 310 may register a comment by specifying a desired section of a video being verified (e.g., viewed, consumed, played, etc.) by a user of an electronic device, for example, the electronic device 110 of FIG. 1, and by storing a comment input by the user on the specified section (e.g., the specified desired section) of the video in association with the specified section of the video stored on the server 150 and provided by the server 150. Additionally, in some example embodiments, the video may be stored and provided by a separate server that is interconnected to the server 150. The user may post an opinion of the user on the video in the form of a comment via a user interface (UI) while playing the video. The user may post a comment relating to the entire video (hereinafter, referred to as a common comment) and/or may select a partial section of the video and may post a comment (hereinafter, referred to as a section comment) related to the selected section (e.g., the selected partial section) of the video.

In the case of specifying a section (hereinafter, referred to as a comment section) to post a section comment in the video, the user may select a single scene in the video being played using, for example, a long tap and a pause, etc., and may specify the selected scene as a comment section. Here, the section comment may be managed based on a scene unit. As another example, the user may specify, as a comment section, a video section of a determined (or, alternatively, desired) time unit, for example, 10 seconds, based on the selected scene. Here, comment sections that overlap by a set ratio or more may be grouped into a single group and section comments may be managed for each group. As another example, when the entire video is equally divided into defined section units, for example, 10 seconds, a unit section including the scene selected by the user may be specified as a comment section. Here, the comment section may be managed for each section unit.

The common comment or the section comment may be in various formats, for example, a text, a voice recording, an image, and a video, and may also use a sticker and an emoji expressing various emotions as images. In the case of the section comment, the comment register 310 may complete a registration of the section comment by storing information related to the comment section in association with the comment input from the user. Here, information associated with the comment section may include a scene or a video section itself corresponding to the comment section or may include a location value in the video corresponding to the comment section. Accordingly, the user may select a desired section, for example, a specific scene or video section, in the video and may post a comment related to the selected section.

In operation S430, the comment provider 320 may highlight the comment section to which the section comment is registered in the video during a process of playing the video through the electronic device, for example, the electronic device 110, or a user of a different electronic device, for example, the electronic device 120, of the user and may display the section comment at a point in time at which the highlighted comment section is displayed on a screen area of the electronic device (e.g., by outputting the section comment to the electronic device for display on a display of the electronic device, the display including the screen area). For example, the comment provider 320 may display the section comment registered to a corresponding comment section in a layer form, for example, a popup screen, at a desired location of the screen area at a point in time at which when the comment section is displayed on the screen area. The entire comments on the video including the section comment and the common comment may be displayed on a separate screen in response to a user request. The section comment may be displayed so that it overlaps an area of a screen, for example, a lower end of the screen at a point in time at which a comment section that includes the registered comment is played. Here, if at least two section comments are registered to a single comment section, the comment provider 320 may select at least one representative comment and may display the selected representative comment, but some example embodiments are not limited thereto and in some example embodiments the comment provider 320 may display all of the section comments registered to the comment section, some of the section comments registered to the comment section, provide a list of the section comments registered to the comment section, etc.

In some example embodiments where at least one representative comment is selected and displayed by the comment provider 320, the representative comment may be selected from among comments registered to a corresponding comment section for each comment section, or may be reselected from among a portion of comments that are selected from among the entire comments on the video. The representative comment may be selected based on a number of positive reactions, for example, a number of likes, a number of views, a number of recommendations, from other users, such as a best comment, etc. . . . It is provided as an example only and the representative comment may be selected based on various criteria. In response to the user selecting a highlighted comment section or a layer on which the section comment is displayed using, for example, a single tap, etc., the comment provider 320 may provide all of the section comments registered to the corresponding comment section. In this manner, the comment provider 320 may provide a community between users based on a unit of the comment section that is a portion in the video, instead of using the entire video.

Figure 5:
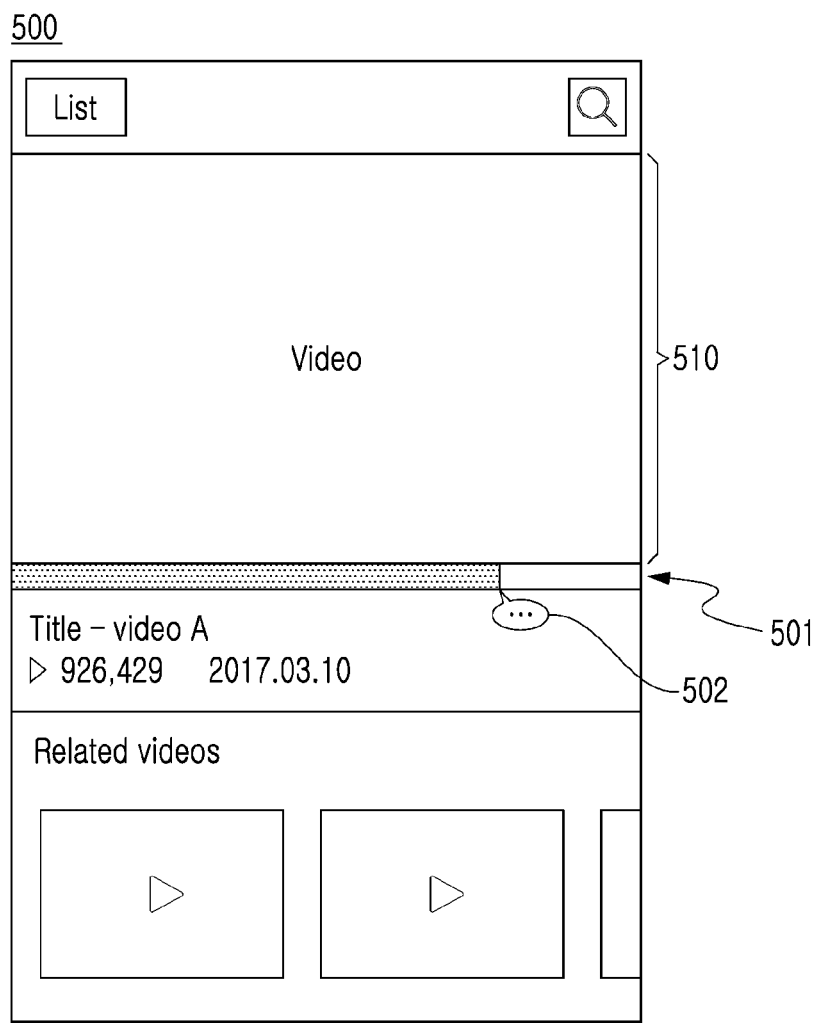
FIGS. 5 through 7 illustrate examples of a method of registering a section comment according to at least one example embodiment.
Figure 6:
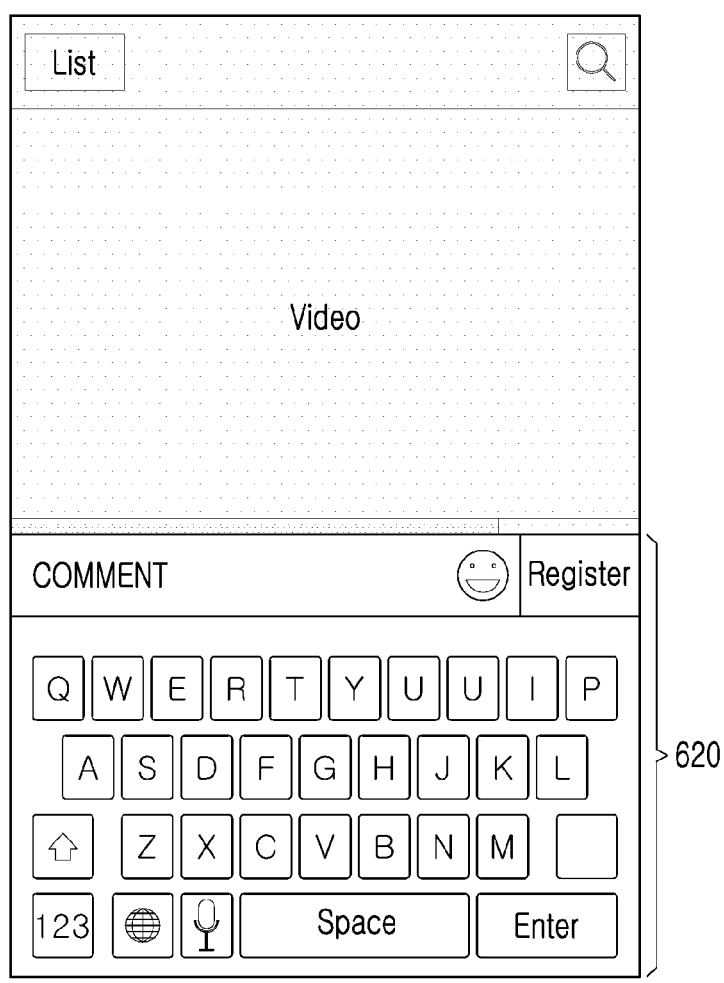
Figure 7:
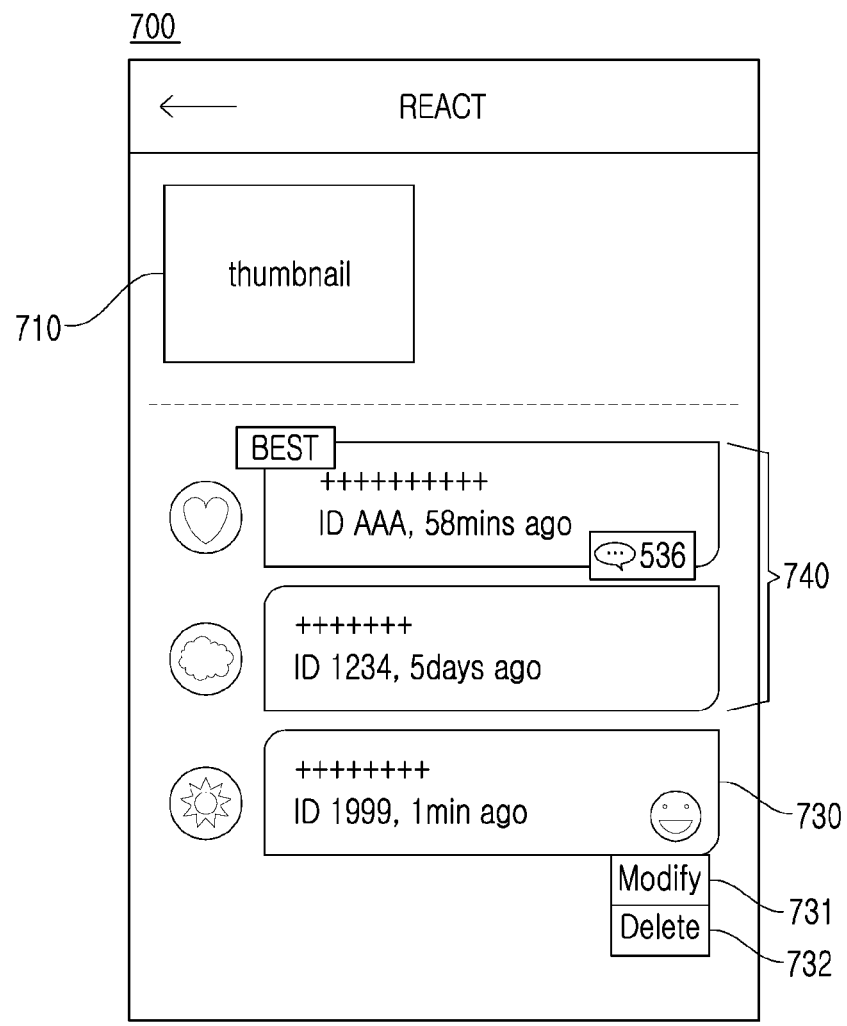

FIGS. 5 through 7 illustrate examples of a process of registering a section comment according to at least one example embodiment.

FIG. 5 illustrates a user interface screen 500 on which a video is displayed. Here, the user interface screen 500 may include a video play area 510 and a progress bar 501 for indicating a play rate of the video.

When the user desires to post a section comment, the user may select a comment section in the video being played on the video play area 510 of the user interface screen 500. For example, the user may select, as the comment section, a corresponding scene or a video of a determined (or, alternatively, desired) section including the scene by performing a UI operation, such as long-tapping or pausing, etc., the video play area 510 on the scene on which the user desires to post a comment while viewing the video being played on the video play area 510. Here, in response to selecting the comment section, the comment register 310 may activate a comment posting user interface (UI) 502 on the progress bar 501 by pausing the video being played and by determining the selected comment section to correspond to a play location of the scene selected by the user in the video.

In response to the user requesting posting of a comment through the comment posting UI 502, the comment register 310 may provide a comment posting screen 620 of FIG. 6. The comment posting screen 620 may include, for example, an interface for posting a comment in a text form, an interface for posting a comment in a voice form, an interface for inputting emoji or a sticker, etc. When the user posts a comment through the comment posting screen 620, the comment register 310 may complete registration of the section comment by storing the comment of the user in association with the comment section corresponding to the desired section of the video on the content server 150 (e.g., storing the user inputted comment in a comment database (not shown) corresponding to the video and/or the desired section of the video based on an identifier corresponding to the comment section, and/or storing the user inputted comment as comment information embedded as code, such as XML or HTML code, Javascript, metadata, etc., in the file of the video itself, etc.).

In response to completing the registration of the section comment, the comment register 310 may provide a section comment screen 700 of FIG. 7. Here, the section comment screen 700 may contemporaneously display video information 710 indicating the comment section selected by the user and a section comment 730 posted by the user on the comment section, and may also display a list of comments 740 registered by other users on the comment section based on the previously registered section comments associated with the comment section using the comment database and/or the embedded comment information of the video. The video information 710 may include a scene image, such as a thumbnail image, etc., selected by the user in the video.

The section comment screen 700 may provide an editing tool including a modify menu 731 that allows modification of the posted comment, and a delete menu 732 that allows for deletion of the posted comment, etc. on the section comment 730 posted by the user. Also, the section comment screen 700 may further include a function of registering a plus-comment (e.g., a response to a comment) on any of section comments registered by other users, a function of registering a reaction, for example, Like, Dislike, Recommend, Upvote, Downvote, etc., to the previously registered comments, etc. Accordingly, in response to completing the registration of the section comment by the user, the comment register 310 may display which opinion the user has posted on which section in the video through the section comment screen 700, and may also provide comments of other users registered to the same comment section. Accordingly, users may quickly share their opinions regarding a particular comment section.

FIGS. 8 through 14 illustrate examples of a process of providing a section comment according to at least one example embodiment.

Figure 8:
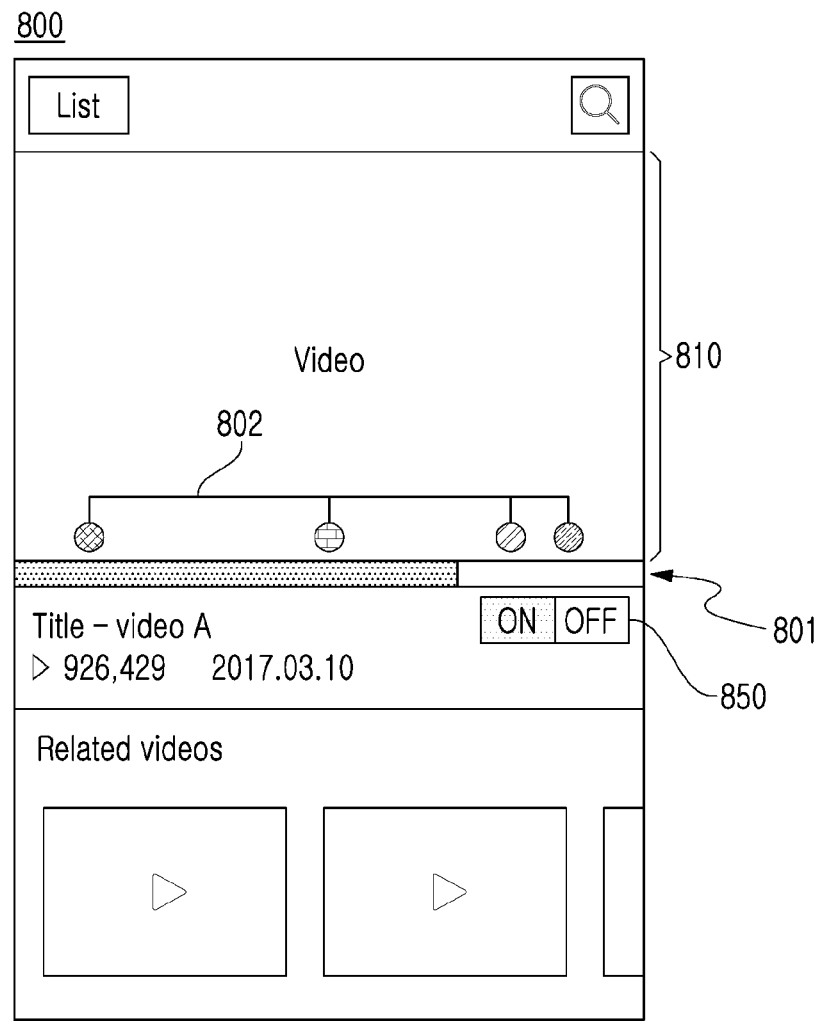
FIGS. 8 through 14 illustrate examples of a method of providing a section comment according to at least one example embodiment.

FIG. 8 illustrates an example of a user interface screen 800 on which a video is displayed, but some example embodiments are not limited thereto. Here, the user interface screen 800 may include a video play area 810 and a progress bar 801 for indicating a play location of the video.

Referring to FIG. 8, the comment provider 320 may highlight and/or display, using an indicator 802, comment sections to which a section comment is registered in the video being displayed on the video play area 810. Here, the comment provider 320 may display a display element of the indicator 802 at a play location of each comment section on the progress bar 801. Also, display elements, for example, different colors and shapes, of the indicator 802 may be differently applied so that the comment sections may be easily distinguished from each other. Also, for example, a size of display elements of the indicator 802 may be differently displayed based on a number of section comments posted by users on each comment section.

Figure 9:
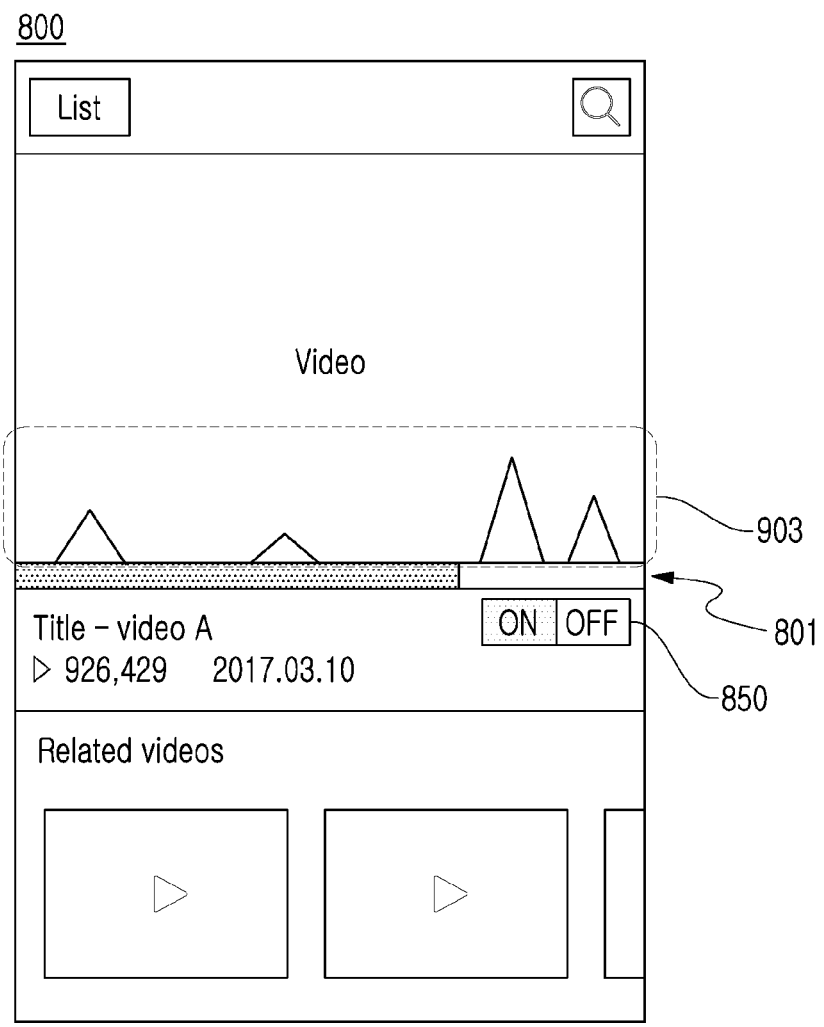
Figure 10:
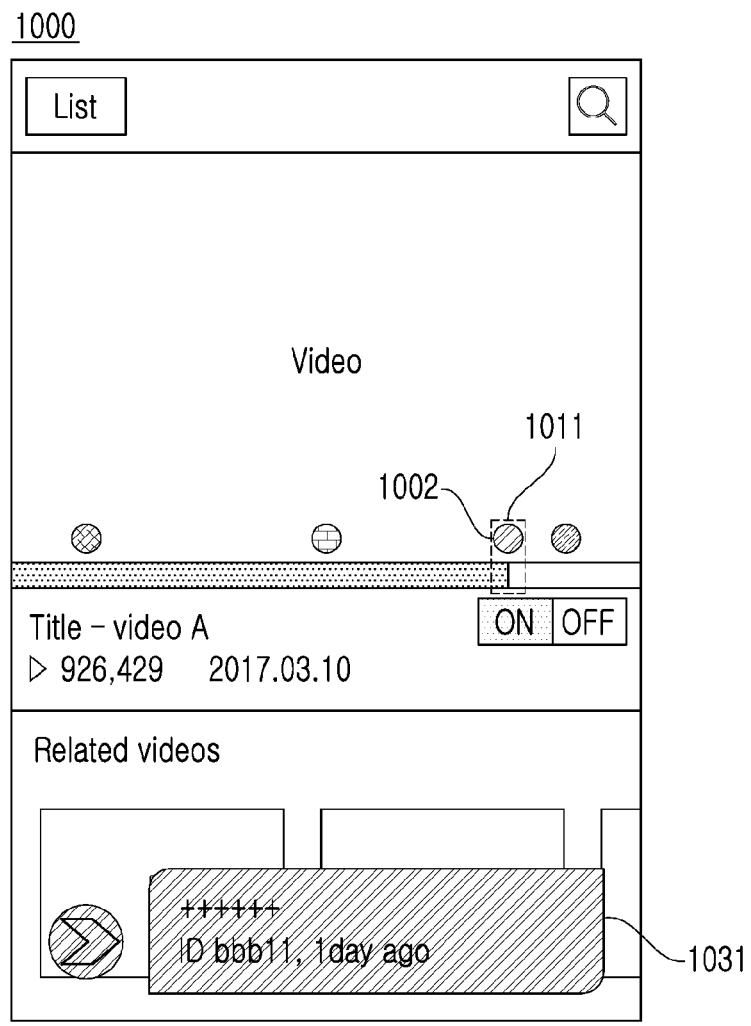

As another example, referring to FIGS. 8-9, an infographic 903 that is a visual representation of data of sections to which users have posted comments may be displayed on the progress bar 801 as a comment timeline for the entire play section of the video. Here, the data may be, for example, a number of section comments for each comment section. The user may easily verify a video section to which users have posted comments and reactions from the infographic 903 on the video being viewed by the user.

The user interface screen 800 may include an interface (ON/OFF) 850 that enables the user to selectively set whether to display a section comment. For example, the user interface screen 800 may display a video in which a display function for a section comment is OFF as a default when providing the video to the user, and may display the section comment based on a play point in time of the comment section in response to a user request for displaying the section comment through the interface 850, that is, if the user selects ON for the display function while viewing the video. As another example, when the user initially views the video, the display function for the section comment may be OFF. When the user views the same video twice or more, the display function for the section comment may be turned ON and the section comment may be provided based on the play point in time of the video. Accordingly, it is possible to not display the section comment when the video is initially provided to the user, and to display the section comment when the user requests displaying of the section comment or when the user views the same video.

The comment provider 320 may sequentially display section comments based on a play point in time for each comment section in the video and may display a corresponding section comment in a layer form (e.g., display the section comment on a different layer, such as a higher layer, than the video) at a desired location of a screen area at a point in time at which a corresponding comment section is played, but the example embodiments are not limited thereto. The comment provider 320 may sequentially display section comments based on the timestamp of the registration of the section comment, whether the section comment is highly rated, whether the section comment is recommended to the user, display a representative section comment, etc. For example, referring to FIG. 10, the comment provider 320 may display a representative comment 1031 at a lower end of a screen area 1000 among section comments registered to a comment section 1011 at a point in time at which the comment section 1011 is played.

Here, the representative comment 1031 may be set to be displayed while the comment section 1011 is being played and to disappear at a point in time at which playing of the comment section 1011 is completed. If the comment section 1011 includes a single scene, a determined (or, alternatively, desired) period of time, for example, 5 seconds, based on the scene may be set as a playtime. Here, a layer color of the representative comment 1031 may be applied based on a color of the display element of the indicator 1002 indicating the comment section 1011.

Figure 11:
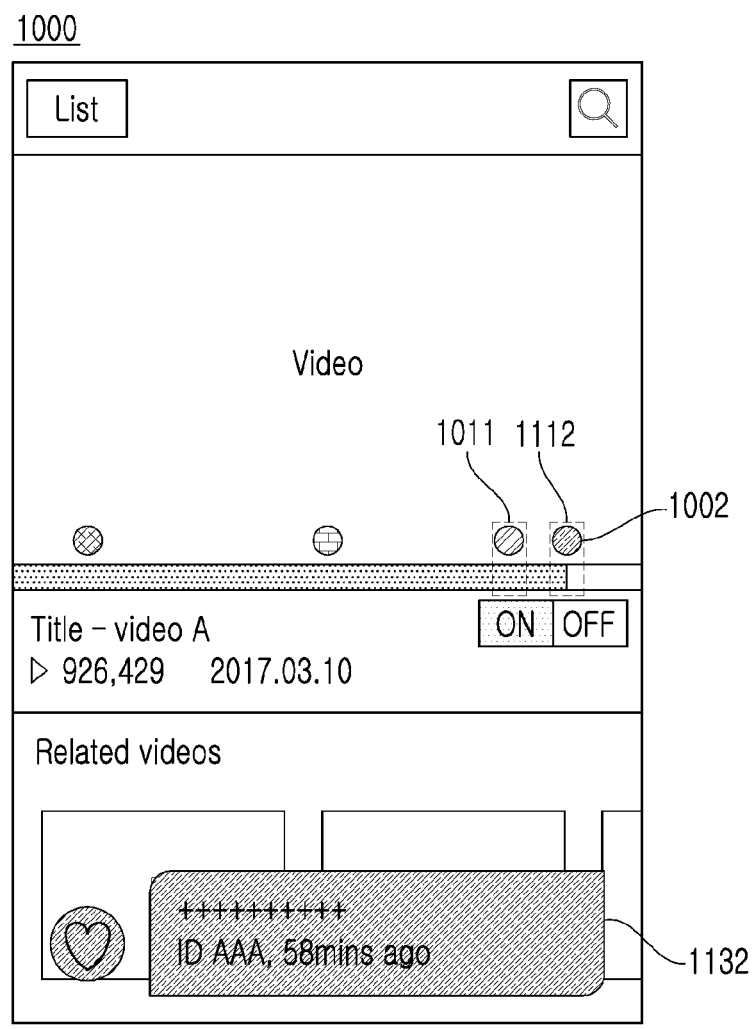

Referring to FIG. 11, when playing of the previous comment section 1011 is terminated and playing of a subsequent comment section 1112 starts according to playing of the video, the comment provider 320 may display a representative comment 1132 among section comments registered to the comment section 1112. Likewise, the representative comment 1132 may be displayed at a lower end of the screen area 1000 based on a point in time at which the comment section 1112 is played. Here, a layer color of the representative comment 1132 may be applied based on a color of the display element of the indicator 1002 indicating the comment section 1112.

Figure 12:
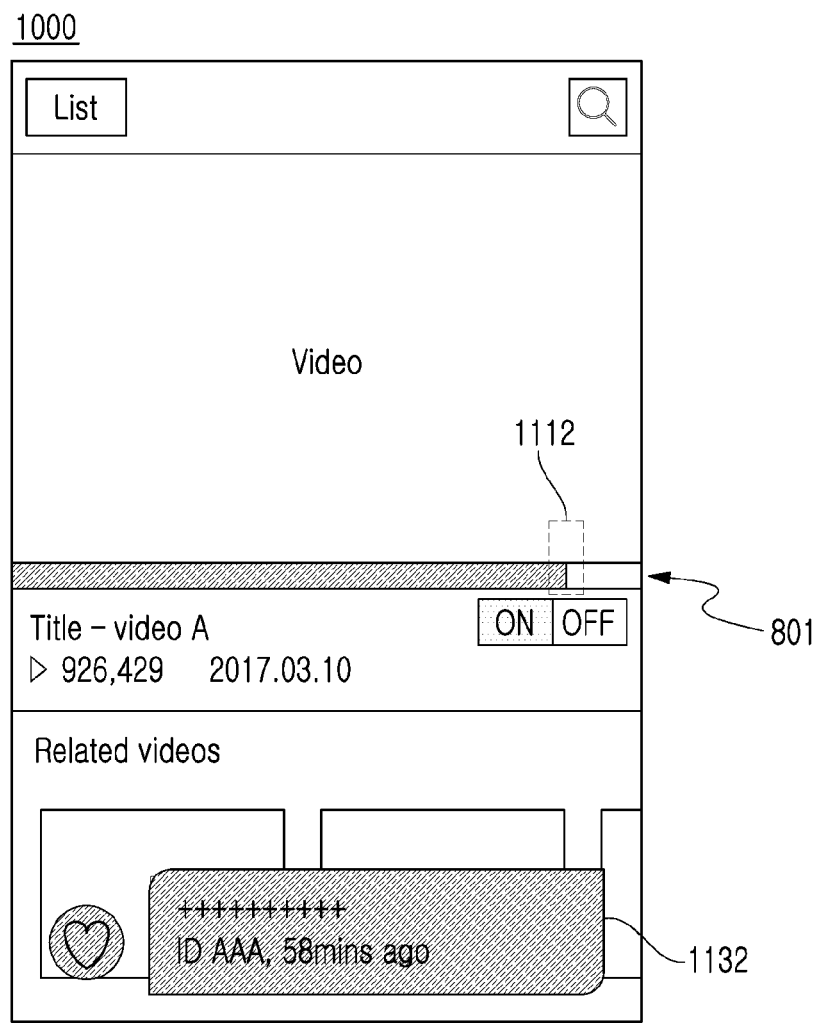
Figure 13:
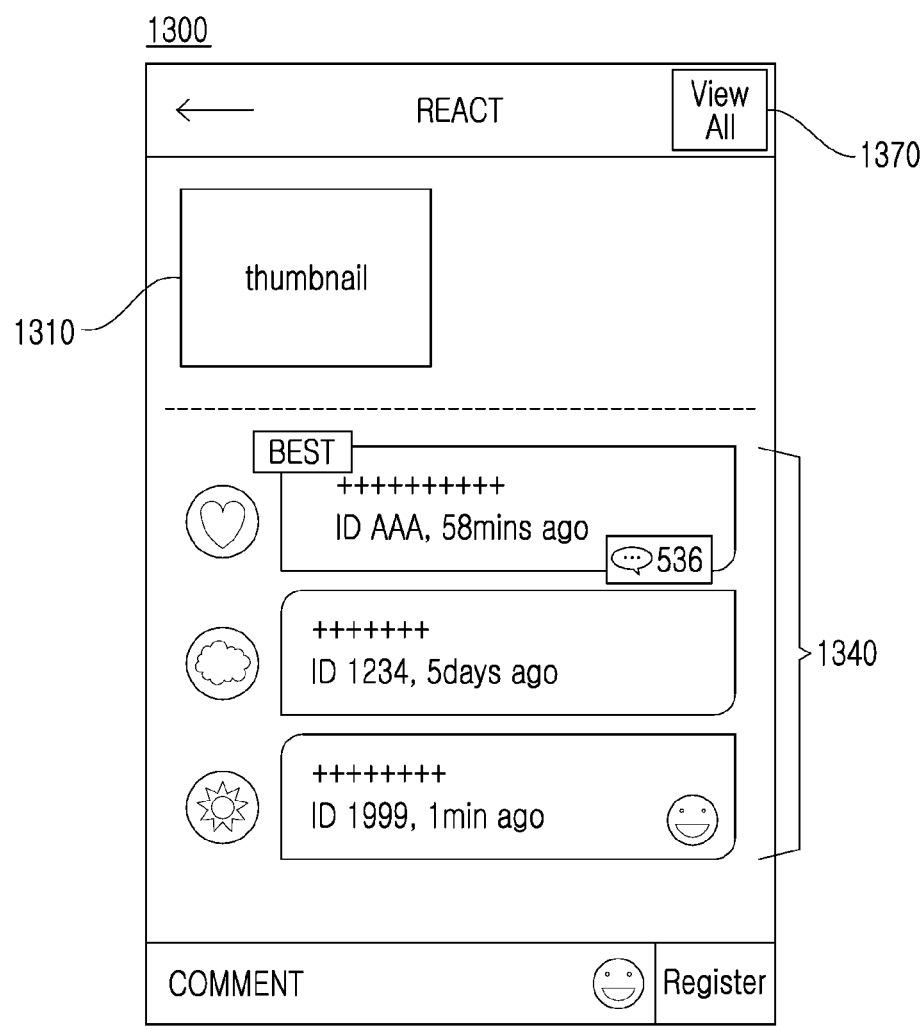

As another example, referring to FIG. 12, the comment section 1112 may be highlighted by changing a color, etc., of the progress bar 801 while the comment section 1112 is being played, instead of using a separate indicator. That is, for example, the comment provider 320 may display the progress bar 801 in a default color in response to playing of the video, but the example embodiments are not limited thereto. Here, the comment provider 320 may change the color of the progress bar 801 from the default color to a determined (or, alternatively, desired) highlight color at a point in time at which the comment section 1112 is played, and, may contemporaneously display the representative comment 1132 among the section comments registered to the comment section 1112. Here, for example, a layer color of the representative comment 1132 may be applied based on the color of the progress bar 801 for highlighting the comment section 1112, but the example embodiments are not limited thereto.

Although a different light color may be applied to each display element, for example, of an indicator or a progress bar, for highlighting a comment section, this is provided as an example only. Any matching method for verifying a section comment that is currently displayed in a layer form may be applied.

In response to the user selecting a desired location of a highlighted comment section and/or a layer on which a representative comment is displayed, the comment provider 320 may provide all of the section comments registered to the corresponding comment section. For example, referring to FIGS. 10 and 13, if the user taps the indicator 1002 indicating the comment section 1011 and/or the representative comment 1031 of FIG. 10, the comment provider 320 may provide a section comment screen 1300 that includes video information 1310 (e.g., a thumbnail image, etc.) associated with the comment section 1011 and a section comment list 1340 of comments posted by other users on the comment section 1011. Here, the section comment screen 1300 provides a list of comments posted by other users on a comment section that is registered for a desired portion of the video. Through this, the section comment screen 1300 may provide a list of comments posted by users based on a unit of a comment section instead of the entire video. To register a section comment to the comment section 1011, the section comment screen 1300 may include an interface for posting a comment in a text form, an interface for posting a comment in a voice and/or audio form, an interface for inputting an emoji and/or a sticker, an interface for inputting a comment in an image and/or video form, etc. Also, the section comment screen 1300 may further include the function of registering a plus-comment on a comment included in the section comment list 1340 and a function of registering a reaction, for example, Like, Recommend, etc. The section comment screen 1300 may further include a "View All" interface 1370 for redirecting to a screen on which it is possible to view all of the comments including section comments with common comments.

Figure 14:
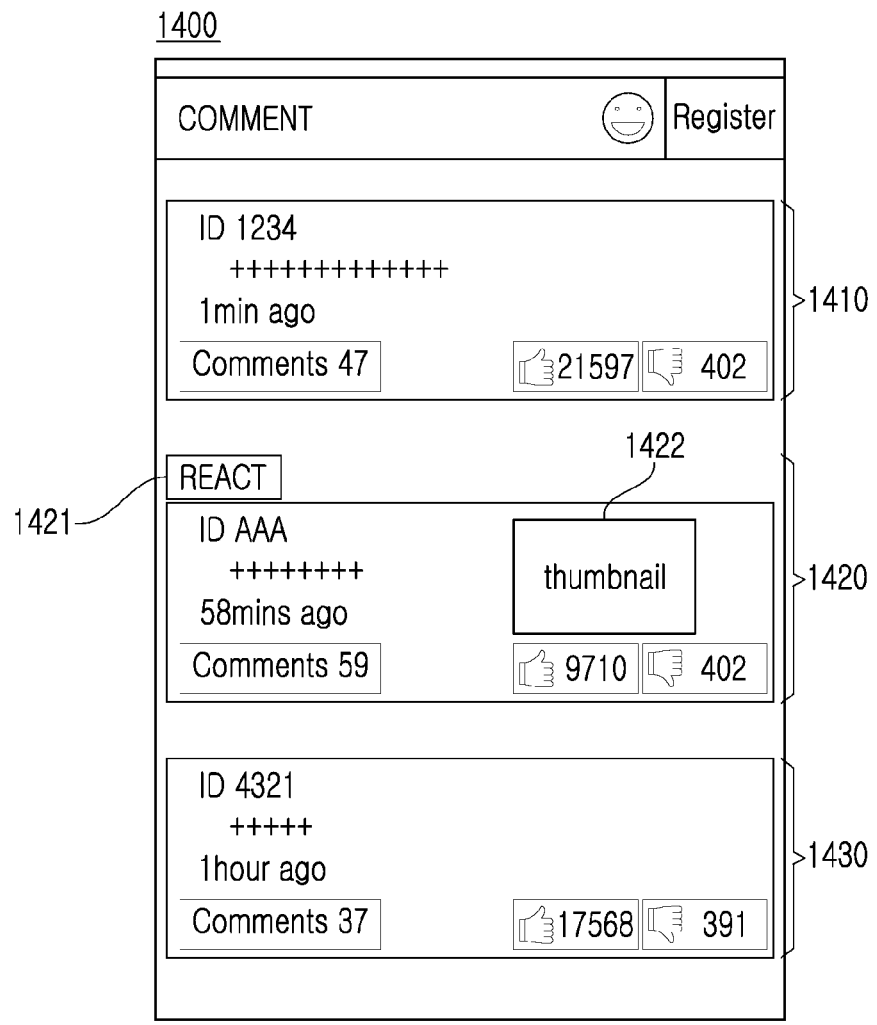

FIG. 14 illustrates an example of an all-comment screen 1400 on which a common comment and a section comment are displayed, according to at least one example embodiment.

Referring to FIG. 14, the all-comment screen 1400 refers to a screen for verifying all comments registered to the entire video or a partial section of the video, and may be displayed on an area separate from a video play area, for example, at a lower end of a service page. The all-comment screen 1400 may be connected, for example, through screen scrolling or through the "View All" interface 1370 displayed on the section comment screen 1300 of FIG. 13.

The all-comment screen 1400 may include common comments 1410 and 1430 that are posted as comments on the entire video without specifying a section and a section comment 1420 that is posted as a comment on a specific comment section by specifying the comment section in the video. Here, a separate display element 1421 may be marked on the section comment 1420 to be distinguished from the common comments 1410 and 1430, or an effect, such as a highlight, different from the common comments 1410 and 1430 may be applied to the section comment 1420, etc.

Video information 1422, such as a thumbnail image, etc., indicating a corresponding comment section may be displayed together with the corresponding section comment 1420 to verify on which section a corresponding comment relates to. Also, the video information 1422 functions as an interface capable of redirecting to a video play area on which the comment section of the video information 1422 is being played in response to selecting the video information 1422 using, for example, a double tap, etc.

The all-comment screen 1400 may include an interface for posting a common comment in a text form, an interface for posting a common comment in a voice and/or audio form, an interface for posting a comment in an image and/or video form, an interface for inputting an emoji and/or a sticker, etc. Also, the all-comment screen 1400 may further include a function of registering a plus-comment on a comment and a function of registering a reaction, such as Like, Recommend, etc.

According to some example embodiments, a user may post a comment on a video section that the user actually sympathizes with or enjoys in a video through highlighting and comment processing on a partial section selected by the user in the video, etc. Also, according to some example embodiments, it is possible to verify a video and a comment contemporaneously and to easily verify the context of the comment and a point at which a user sympathizes with by providing a highlighted comment based on a portion displayed on a play section during a process of playing the video. Consequently, the example embodiments thereby improve existing Internet commenting systems and/or online commenting systems by allowing users to specify exact portions, subsections, and/or positions of the video that they are commenting about, and allowing for viewers of the content and the posted comments to be able to view both the content and the response to the content contemporaneously and/or side-by-side, thereby improving and amplifying the effect of the comment. Further, because the commenter may comment directly on the Internet content using the example embodiments, the commenter may reach a wider audience regarding his or her comments than is possible using pre-Internet technology.

The systems and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented comment processing method comprising:
    specifying, using at least one processor, a desired section in a video in response to a selection of a user;
    registering, using the at least one processor, a first comment input from the user to the specified section by associating the first comment of a plurality of comments with the specified section of a plurality of sections of the video; and
    outputting, using the at least one processor, at least one comment among the plurality of comments registered to at least one corresponding section among the plurality of sections to a display at a point in time at which the at least one corresponding section is played,
    wherein the outputting comprises,
        selecting, using the at least one processor, a representative comment from among the at least one comment registered to a respective section among the at least one corresponding section for each of the at least one corresponding section, the selecting being based on a number of positive reactions associated with each of the at least one comment, said at least one corresponding section including the specified section to which the first comment is registered, and
        outputting, using the at least one processor, the representative comment registered to the respective section at a point in time at which the respective section is played, and
    wherein the method further comprises,
        providing, using the at least one processor, a section comment screen in response to a selection of the representative comment, the section comment screen including a list of all comments registered to the respective section and an all-comment list interface,
        providing, using the at least one processor, an all-comment list of the plurality of comments registered to the video in response to a selection of the all-comment list interface, the plurality of comments including both a plurality of common comments and a plurality of partial section comments, each of the plurality of common comments being associated with an entirety of the video without being associated with a particular section of the video, the all-comment list including a common comment interface configured to permit posting of another common comment, each of the plurality of partial section comments being registered to one of the plurality of sections of the video, and the providing the all-comment list including outputting the plurality of comments such that the plurality of partial section comments are distinguished from the plurality of common comments in the all-comment list by associating each of the plurality of partial section comments with a distinguishing indicator not associated with any of the plurality of common comments, the distinguishing indicator including a particular display element or a highlight, and
        providing a comment posting interface on a portion of a progress bar of the video in response to the specifying, the portion of the progress bar indicating a division between a played portion of the video and an unplayed portion of the video,
    wherein the registering registers the first comment in response to a selection of the comment posting interface.

2. The comment processing method of claim 1, wherein the outputting comprises outputting the representative comment to the display in a layer form at a desired location of a screen area on which the video is played.

3. The comment processing method of claim 1, wherein the outputting comprises outputting an infographic to the display that is a visual representation of data of the at least one corresponding section as a comment timeline for an entire play section of the video.

4. The comment processing method of claim 1, wherein the outputting comprises highlighting the respective section to which the representative comment is registered in the video using a first indicator.

5. The comment processing method of claim 4, wherein the at least one corresponding section includes two or more sections among the plurality of sections, and the outputting comprises,
    applying a different display element of the first indicator for each of the two or more sections to which the at least one comment is registered in the video, and
    outputting the representative comment to the display based on the display element of the first indicator for the respective section.

6. The comment processing method of claim 1, wherein the outputting comprises highlighting the respective section to which the representative comment is registered using a progress bar for the video.

7. The comment processing method of claim 1, wherein the outputting comprises outputting the representative comment to the display only in response to, receiving a comment display request from the user, or determining that the video has been previously provided to the user.

8. The comment processing method of claim 1, wherein the providing the all-comment list comprises outputting section information associated with each of the partial section comments in the all-comment list to the display.

9. The comment processing method of claim 1, further comprising:
registering, using the at least one processor, a plus-comment or reaction input from the user to a selected comment among the list of all comments based on the providing the section comment screen.

10. The comment processing method of claim 1, wherein the all-comment list includes a plurality of thumbnail images displayed in association with the plurality of comments, each respective thumbnail image being associated with a respective section among the plurality of sections.

11. The comment processing method of claim 1, wherein the registering comprises:
providing a comment posting screen in response to the selection of the comment posting interface; and
receiving the first comment via the comment posting screen.

12. A non-transitory computer-readable recording medium storing computer-readable instructions that, when executed by at least one processor, cause the at least one processor to:
specify a desired section in a video in response to a selection of a user;
register a first comment input from the user to the specified section by associating the first comment of a plurality of comments with the specified section of a plurality of sections of the video; and
output at least one comment among the plurality of comments registered to at least one corresponding section among the plurality of sections to a display at a point in time at which the at least one corresponding section is played,
wherein the computer-readable instructions cause the at least one processor to output the at least one comment including,
selecting a representative comment from among the at least one comment registered to a respective section among the at least one corresponding section for each of the at least one corresponding section, the selecting being based on a number of positive reactions associated with each of the at least one comment, said at least one corresponding section including the specified section to which the first comment is registered, and
outputting the representative comment registered to the respective section at a point in time at which the respective section is played, and wherein the computer-readable instructions cause the at least one processor to,
provide a section comment screen in response to a selection of the representative comment, the section comment screen including a list of all comments registered to the respective section and an all-comment list interface,
provide an all-comment list of the plurality of comments registered to the video in response to a selection of the all-comment list interface, the plurality of comments including both a plurality of common comments and a plurality of partial section comments, each of the plurality of common comments being associated with an entirety of the video without being associated with a particular section of the video, the all-comment list including a common comment interface configured to permit posting of another common comment, each of the plurality of partial section comments being registered to one of the plurality of sections of the video, and the provision of the all-comment list including outputting the plurality of comments such that the plurality of partial section comments are distinguished from the plurality of common comments in the all-comment list by associating each of the plurality of partial section comments with a distinguishing indicator not associated with any of the plurality of common comments, the distinguishing indicator including a particular display element or a highlight, and
providing a comment posting interface on a portion of a progress bar of the video in response to the specification of the desired section, the portion of the progress bar indicating a division between a played portion of the video and an unplayed portion of the video,
wherein the registration registers the first comment in response to a selection of the comment posting interface.

13. The non-transitory computer-readable recording medium of claim 12, wherein the at least one processor is configured to output the representative comment to the display in a layer form at a desired location of a screen area on which the video is played.

14. A computer-implemented comment processing system comprising:
at least one processor configured to execute computer-readable instructions to,
specify a desired section in a video in response to a selection of a user, and
register a first comment input from the user to the specified section by associating the first comment of a plurality of comments with the specified section of a plurality of sections of the video, and
output at least one comment among the plurality of comments registered to at least one corresponding section among the plurality of sections to a display at a point in time at which the at least one corresponding section is played,
wherein the at least one processor is configured to execute computer-readable instructions to output the at least one comment including,
selecting a representative comment from among the at least one comment registered to a respective section among the at least one corresponding section for each of the at least one corresponding section, the selecting being based on a number of positive reactions associated with each of the at least one comment, said at least one corresponding section including the specified section to which the first comment is registered, and
outputting the representative comment registered to the respective section at a point in time at which the respective section is played, and
wherein the at least one processor is configured to execute computer-readable instructions to,
provide a section comment screen in response to a selection of the representative comment, the section comment screen including a list of all comments registered to the respective section and an all-comment list interface, provide an all-comment list of the plurality of comments registered to the video in response to a selection of the all-comment list interface, the plurality of comments including both a plurality of common comments and a plurality of partial section comments, each of the plurality of common comments being associated with an entirety of the video without being associated with a particular section of the video, the all-comment list including a common comment interface configured to permit posting of another common comment, each of the plurality of partial section comments being registered to one of the plurality of sections of the video, and the provision of the all-comment list including outputting the plurality of comments such that the plurality of partial section comments are distinguished from the plurality of common comments in the all-comment list by associating each of the plurality of partial section comments with a distinguishing indicator not associated with any of the plurality of common comments, the distinguishing indicator including a particular display element or a highlight, and providing a comment posting interface on a portion of a progress bar of the video in response to the specification of the desired section, the portion of the progress bar indicating a division between a played portion of the video and an unplayed portion of the video, wherein the registration registers the first comment in response to a selection of the comment posting interface.

15. The comment processing system of claim 14, wherein the at least one processor is configured to output the representative comment to the display in a layer form at a desired location of a screen area on which the video is played.

16. The comment processing system of claim 14, wherein the at least one processor is configured to output an infographic to the display that is a visual representation of data of the at least one corresponding section as a comment timeline for an entire play section of the video.

17. The comment processing system of claim 14, wherein the at least one processor is configured to highlight the respective section to which the representative comment is registered in the video using a first indicator.

18. The comment processing system of claim 17, wherein
the at least one corresponding section includes two or more sections among the plurality of sections, and
the at least one processor is configured to,
apply a different display element of the first indicator for each of the two or more sections to which the at least one comment is registered in the video, and
output the representative comment to the display based on the display element of the first indicator for the respective section.

19. The comment processing system of claim 14, wherein the at least one processor is configured to output the representative comment to the display only in response to,
receiving a comment display request from the user, or
determining that the video has been previously provided to the user.

20. The comment processing system of claim 14, wherein the at least one processor is configured to output section information associated with each of the partial section comments in the all-comment list to the display.

\* \* \* \* \*